United States Patent [19]

Dickinson

[11] Patent Number: 4,872,770
[45] Date of Patent: Oct. 10, 1989

[54] ANTIFRICTION BEARING WITH SEAL ARRANGEMENT

[75] Inventor: Thorn W. Dickinson, Berlin, Conn.

[73] Assignee: The Torrington Company, Torrington, Conn.

[21] Appl. No.: 340,739

[22] Filed: Apr. 20, 1989

[51] Int. Cl.$^4$ .............................................. F16C 33/72
[52] U.S. Cl. .................................. 384/484; 277/152; 384/477
[58] Field of Search ................ 384/477, 478, 480–489; 277/152, 37

[56] References Cited

U.S. PATENT DOCUMENTS

| | | | |
|---|---|---|---|
| 3,519,316 | 7/1970 | Göthberg | 384/485 X |
| 3,594,050 | 7/1971 | Göthberg | 384/484 |
| 3,856,368 | 12/1974 | Anderson | 384/485 |
| 4,336,971 | 6/1982 | Reiter | 384/484 |

FOREIGN PATENT DOCUMENTS 1062488  7/1959  Fed. Rep. of Germany ...... 384/477

Primary Examiner—Thomas R. Hannon
Attorney, Agent, or Firm—Frank S. Troidl

[57] ABSTRACT

An end seal is provided at each axial end of the bearing. The structure of the bearing and the structure of the end seal is such that the axial length, radial length, and bearing capacity of the new bearing is substantially the same as the standard axial length, radial width, and roller member capacity of bearings without seals.

1 Claim, 1 Drawing Sheet

ANTIFRICTION BEARING WITH SEAL ARRANGEMENT

This invention relates to antifriction bearings. More particularly, this invention is a new antifriction bearing including a novel sealing arrangement.

Double row spherical roller bearings have been manufactured for some time. An example of a typical double row spherical roller bearing is shown and described in U.S. Pat. No. 1,907,421 issued May 2, 1933 to H. R. Gibbons and entitled "Antifriction Bearing". The structure of the typical double row spherical roller bearing is such that very little space for seals is available unless the radial length of the bearing is increased to make room for the seal or the area of rolling contact of the rolling members with the raceways is reduced to make room for the seal. It is important that the bearing be as compact as possible and that the rolling member capacity be as great as possible with the compact structure. Thus, there are clear disadvantages when it is necessary in order to build a double row spherical roller bearing with a seal that the dimensions be different from a bearing without a seal in order to make room for the seal.

This invention is a bearing with a seal. The radial length, axial length, and bearing capacity are substantially the same as the radial length, axial length, and bearing capacity of a conventional double row spherical roller bearing which does not have a seal.

Briefly described, the bearing comprises an annular inner race and an annular outer race. The annular outer race has a predetermined axial length and an inside diameter greater than the outside diameter of the annular inner race thereby providing an inner race-outer race annulus. The outer race has radially extending end surfaces. At least one circle of rolling members is provided in the outer race-inner race annulus. A pair of axially spaced annular sealing members seal the inner race-outer race annulus. Each sealing member extends from the outside perimeter of the inner race to the outer race, along a radially extending end surface of the outer race, and partially over the outside periphery of the outer race.

The invention as well as its many advantages will be further understood by reference to the following detailed description and drawings in which.

In the various figures, like parts are referred to by like numbers.

Figures 1, 2:
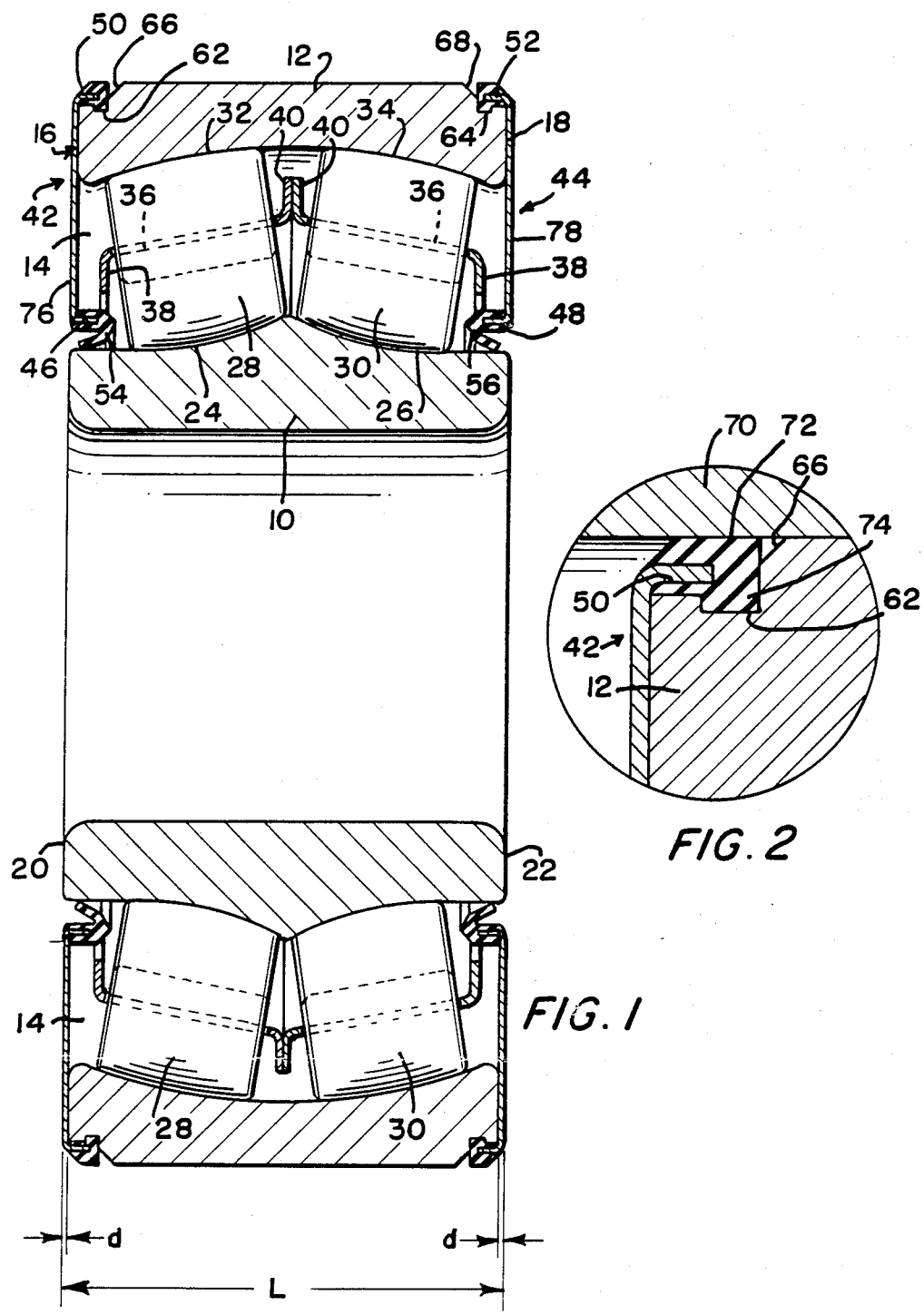
FIG. 1 is a transverse central section of the bearing.
FIG. 2 is a fragmentary view on an increased scale showing the configuration of the rubber seal insert molded on the outside of the sealing member when the bearing is mounted within a housing bore.

Referring to the drawings and more particularly to FIG. 1, a double row spherical roller bearing is shown including an annular inner race 10 and an annular outer race 12 having an inside diameter greater than the outside diameter of the annular inner race thereby providing an inner race-outer race annulus 14. The outer annular race 12 has the same axial center as the inner annular race 10 but is axially shorter than the annular inner race 10 by the amount "d" at each axial end of the outer race 12. Therefore, the radially extending surfaces 16 and 18 on the axial ends of the outer race 12 are each spaced axially inwardly from the corresponding radially extending end surfaces 20 and 22, respectively, of the inner race 10 by an amount "d". The inner race 10 has oppositely inclined raceways 24 and 26 which have a curvature conforming to the curvature of spherical rollers 28 and 30. The rollers 28 and 30 also run on raceways 32 and 34, respectively of the outer race 12. Raceways 32 and 34 also have a curvature conforming to the curvature of spherical rollers 28 and 30.

A cage is provided for each row of rollers and comprises an inwardly extending stiffening flange 38, and an outwardly extending stiffening flange 40. The circumferentially separated crossbars 36 interconnect the stiffening flanges and provide circumferentially separated pockets. The spherical rollers are in the pockets.

A pair of axially spaced annular sealing members 42 and 44 seal the inner race-outer race annulus 14. Each sealing member extends from the outside periphery of the inner race 10, across the inner race-outer race annulus, along a radially extending end surface of the outer race 12, and partially over the outside periphery of the outer race.

The annular sealing members each have an annular metal part comprising an axially inwardly extending radially inside portion and an axially inwardly extending radially outside portion. Each radially inside portion 46 and 48 of the metal parts of annular sealing members 42 and 44, respectively are radially spaced from the outside periphery of the inner race 10. The radially outside portion 50 and 52, extend partially over the outside periphery of the outer race 12. A rubber seal lip 54 and 56 is molded on the inside portions 46 and 48, respectively, and are in contact with the outside periphery of the inner race 10 to form a seal with the inner race. Referring to FIG. 1 and FIG. 2, the outer race 12 has end portions on the outside periphery which are smaller in diameter than the diameter of the remainder of the outer race. The smaller diameter portions have annular grooves 62 and 64, respectively, which are adjacent the shoulders 66 and 68, respectively, separating the smaller diameter portions from the remainder of the outer race.

A rubber insert is molded on the axially outside metal portions 50 and 52. Referring to FIG. 2, the detailed structure of one rubber insert is shown when the bearing is mounted within a bore of a housing 70. The rubber insert has an axially extending annular surface 72 which is in contact with the bore surface of the housing 70. The outside diameter of the surface 72 is substantially the same as the larger diameter of the outer race. Thus, when the bearing is inserted in the housing, there is a seal with the housing. The rubber insert also has an annular portion 74 which snaps into the groove 62 when the annular sealing member 42 is placed over the end of the outer ring. Therefore, the rubber insert is locked in the annular groove when the bearing is inserted into the bore of the housing 70. The detailed structure of the other rubber insert is the same as the one just described.

After the bearing is assembled in the housing, the housing bore locks the seals in the outer race grooves so that they will not be forced out during high pressure regreasing or some other means. The seals can be removed only if the bearing is removed from the housing.

Referring to FIG. 1, the metal surface 76 of seal 42 extends across the inner race-outer race annulus 14 and along the radially extending end surface 16 of the outer race 12 along the same radial plane as the plane of the inner race end surface 20. Also, the metal surface 78 of seal 44 extends across the inner race-outer race annulus 14 and along the radially extending end surface 18 of the outer race 12 along the same radial plane as the inner race end surface 22.

The length of the outer race of antifriction bearings such as the antifriction bearing described in the Gibbons U.S. Pat. No. 1,907,421 issued May 2, 1933 and entitled "Antifriction Bearing" is standardized. With applicants' new antifriction bearing the standardized length "L" is obtained by making the axial length of outer race 12 shorter than standard and making up the difference by the thickness of the radially extending metal portions of the metal parts of the seals. The outer race 12 is axially shorter than the inner race 10. However, the structure of the annular seals 42 and 44 is such that the overall length of the outer race is not increased by the addition of the end seals. Also, the radial length of the bearing is standardized. The rubber inserts extending partially over the outer periphery of the outer race 12 do not increase the standardized radial length of the bearing. Thus, this new antifriction bearing is an antifriction bearing which is sealed and has the same boundary dimensions as standardized antifriction bearings of the same type and maintains the bearing capacity.

Though the new seal configuration is described herein with a double row spherical roller bearing, it may be used with other similar type bearings such as bearings having only one row or circle of rolling members in the annulus.

I claim:

1. A bearing comprising: an annular inner race; an annular outer race having an inside diameter greater than the outside diameter of the annular inner race thereby providing an inner race–outer race annulus, both end surfaces of each race extending radially to the axis of the bearing, each end surface of the outer race being spaced axially inwardly from its corresponding inner race end surface, the axial end portions of the outer race having a smaller outside diameter than the outside diameter of the remainder of the outer race, each smaller outside diameter of the outer race having an annular groove; and a pair of axially spaced annular sealing members sealing the inner race–outer race annulus, each sealing member having a metal part consisting of an axially inwardly extending radially inside portion radially spaced from the outside periphery of the inner race, and an axially extending radially outside portion extending over the corresponding smaller outside diameter of the outer race interconnected by a portion having its axially outside surface extending along the same radial plane as the corresponding inner race end surface; a rubber seal lip molded on the metal part inside portion and in contact with the outside periphery of the inner race; and a rubber insert molded on the metal part outside portion, the rubber insert having an outside diameter substantially the same as the diameter of the remainder of the outer race, the rubber insert also having an annular portion fitting into said groove whereby the rubber insert is locked in the annular groove when the bearing is inserted into the bore of a housing.

* * * * *